April 20, 1954 — P. S. MORGAN — 2,675,898
UNIDIRECTIONAL DRIVE COUPLING
Filed Sept. 12, 1950 — 2 Sheets-Sheet 1

Inventor
Porter S. Morgan,
By Albert R. Henry
Attorney

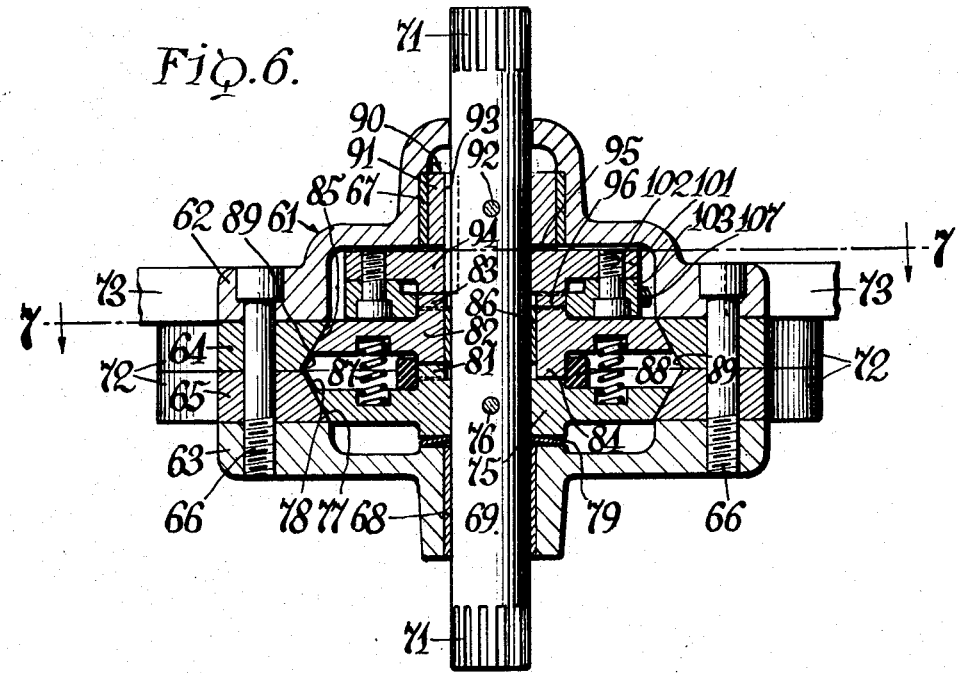

Patented Apr. 20, 1954

2,675,898

UNITED STATES PATENT OFFICE 2,675,898

UNIDIRECTIONAL DRIVE COUPLING

Porter S. Morgan, Westport, Conn., assignor to The Connecticut Variable Gear Corporation, New Haven, Conn.

Application September 12, 1950, Serial No. 184,405

8 Claims. (Cl. 192—41)

This invention relates to a unidirectional drive coupling, and it has particular reference to the provision of a rotary ratchet mechanism, wherein an input shaft may be freely rotated in one direction with respect to an output housing or member, and will be fixedly connected thereto when the rotative torque is applied in the opposite direction.

The invention contemplates a drive coupling wherein rotation of an input or driving shaft in one direction will cause one or more clutch plates to move into locking engagement with clutch surfaces, which surfaces may be connected either to a driven shaft or to a stationary housing, thereby either to transmit motion or to restrain the input shaft from rotation. Rotation of the input shaft in the opposite direction causes disengagement between the clutch plates and surfaces. As hereinafter described, the clutch plates may take the form of spaced discs, respectively locked and rotatably mounted on the driving shaft, and to which axial movement is imparted by the shaft rotation. This motion is sufficient to force the discs toward or away from the cooperating clutch surfaces, thereby effecting either engagement or disengagement.

One objection which has been raised in connection with various types of friction clutches has been the tendency of the clutch surfaces to contact or to separate slowly, or drag, thereby increasing the wear and also setting up unsatisfactory conditions of operation. The coupling of the present invention is so constituted that only a very slight movement is required to effect engagement or disengagement, thus reducing the effect of dragging to a minimum. Another feature of the invention resides in the provision of a coupling of the friction clutch type wherein there is automatic compensation for any tendency of the clutch surfaces to slip under high resistance conditions, the increase in the load imposed by the driven member causing the clutch surfaces to be forced more tightly together. Another feature of the invention is the provision of a unidirectional clutch mechanism, wherein the adverse effects of centrifugal forces are avoided. The present invention may also include a speed responsive means, operative when a predetermined speed is reached, to effect positive disengagement of the clutch elements, so that even adventitious contact or dragging is eliminated.

The principles of the invention, and practical embodiments thereof, will be understood from the following detailed description, to be read in connection with the accompanying drawings, wherein:

Fig. 6 is a view similar to Fig. 1, showing another embodiment of the invention in which is included centrifugally operated means for effecting positive disengagement of the clutch members; and Fig. 7 is a section taken substantially on the line 7—7 of Fig. 6.

Figure 1:
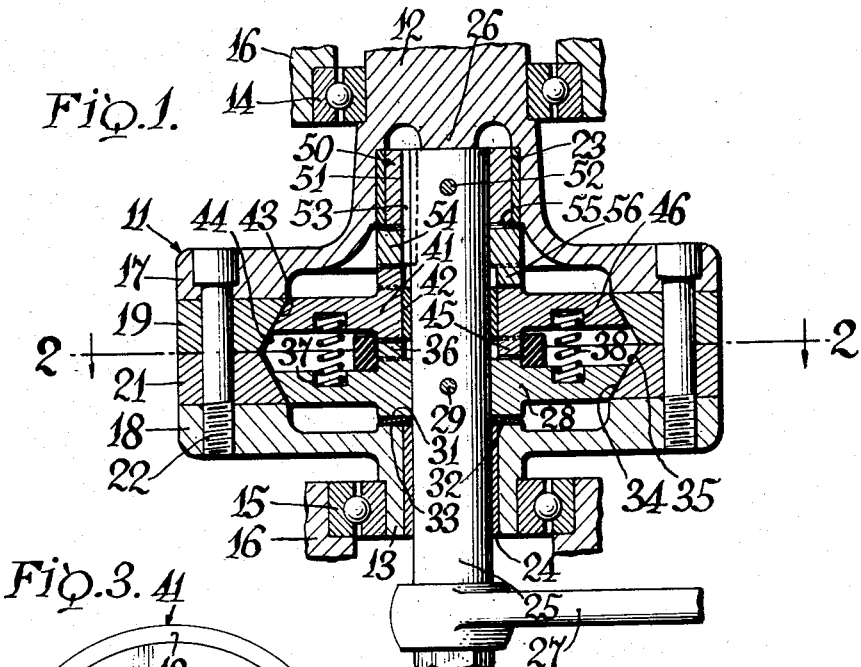
Fig. 1 is an axial section through a coupling embodying one form of the invention.
Figure 3:
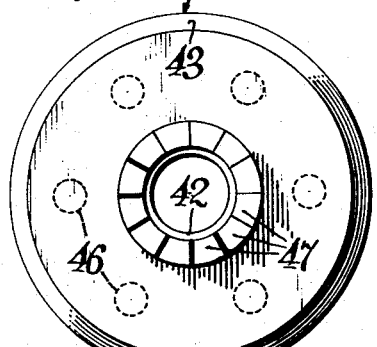
Fig. 3 is a top plan of the upper and relatively rotatable clutch disc.

Referring first to Figs. 1 to 5, the coupling comprises a housing 11 of generally cylindrical form having axially extending trunnions 12 and 13 at its ends which are rotatably mounted in bearings 14 and 15, carried by a fixed frame member 16. The housing 11 is advantageously formed with end sections 17 and 18, which include the trunnions, and with interposed annular plates 19 and 21 constituting clutch elements. These parts are interconnected by bolts 22, which obviously may be readily removed for purposes of disassembly.

Each of the trunnions 12 and 13 is bored to receive bearing bushings 23 and 24 respectively, in which is rotatably mounted an input shaft 25. The shaft abuts a thrust pad 26 formed within the bore of the trunnion 12, and projects beyond the trunnion 13 to receive an oscillatable drive lever 27, by means of which the coupling may be operated. It will be understood that the arcuate movement of the lever 27, imparted from any desired power source, causes motion of the housing 11 when the movement is in one direction, but not in the other. It will also be obvious that any suitable machine element, such as a gear, not shown, may be keyed to the end of the trunnion 12 to serve as a power take-off means.

The means for effecting the unidirectional motion of the housing 11 includes a lower clutch disc 28, secured to the shaft 25 by means of a pin 29, and formed with a pad 31 which abuts a resilient thrust washer 32 resting on a shoulder 33 formed within the end section 18. The disc 28 is formed with a frusto-conical periphery 34, which, under certain conditions of operation, is adapted to bind against the internal conical face 35 of the clutch plate 21. The upper surface of the disc 28 is formed with an annulus of clutch or ratchet teeth 36, disposed adjacent the shaft 25, and with a series of sockets 37 in which are seated coiled springs 38. An annular bumper ring 39, of synthetic rubber or like resilient material, encircles the teeth 36.

Figure 5:
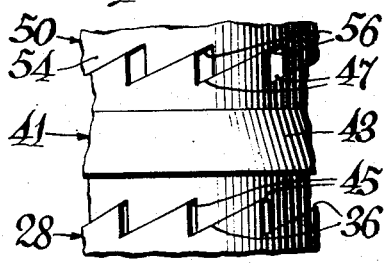
Fig. 5 is an enlarged fragmentary elevation of the shaft supported coupling members.
Figure 4:
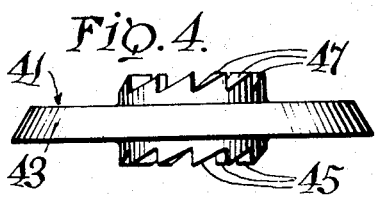
Fig. 4 is an elevation of the disc shown in Fig. 3.
Figure 2:
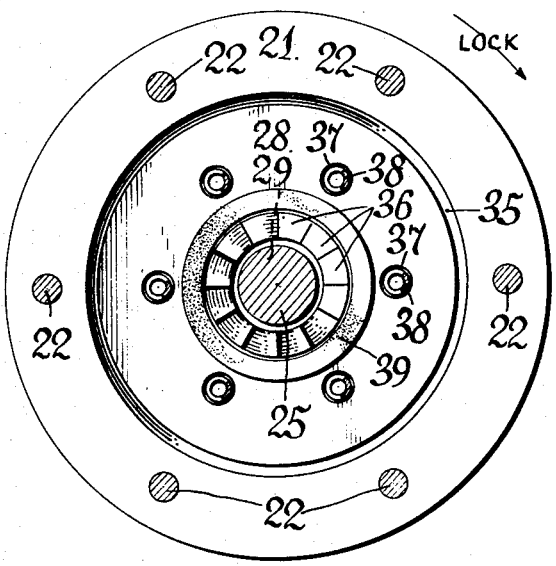
Fig. 2 is a section taken substantially on the line 2—2 of Fig. 1, showing in plan the lower shaft-connected clutch disc.

A second clutch disc 41 is rotatably mounted on the shaft 25, above the disc 28, by means of a bushing 42, and it also is formed with a frustoconical periphery 43 adapted to bind against the internal conical face 44 of the clutch plate 19. The disc 41 is formed with a lower annulus of ratchet teeth 45 which mesh with the teeth 36, and with a series of sockets 46 to receive the opposite ends of the springs 38. The upper surface of the disc 41 is also formed with an annulus of clutch teeth 47, which, as best shown in Fig. 5, have the same contours as the lower teeth 45, but are slightly offset or out of phase therewith. It will also be apparent from Fig. 5 that if the shaft 25 and secured disc 28 are rotated in one direction, the cam action between the teeth 36 and 45 will thrust the discs 28 and 41 apart, causing their peripheral portions to engage the inner surfaces of the plates 21 and 19. Rotation in the opposite direction will, of course, permit disengagement.

The housing 11 also contains a reaction member 50, herein shown as a sleeve 51 secured to the shaft 25 at its inner end by means of a pin 52 and key 53, and thus made rotatable with the shaft within the bearing 23. The reaction member also includes a collar 54 into which the key 53 extends, thereby fixedly connecting the collar and sleeve for rotary movement. Shims 55 are interposed between the sleeve 51 and collar 54, to obtain correct axial adjustment of the parts. The lower end of the collar 54 is formed with a circular series of ratchet teeth 56, which mesh with the teeth 47 of the disc 41.

The parts are so assembled that, when the shaft 25 is at one extreme position of its intended movement, the reaction teeth 56 on the collar 54 are displaced to the right, as viewed in Fig. 5, to depress the disc 41 so that its periphery 43 has running clearance with respect to the conical clutch surface 44 of the plate 19. This action moves the disc 41 axially, with its lower teeth 45 riding on the teeth 36 of the lower disc 28. The lower disc is so adjusted along the shaft 25 that, in this position, its periphery 34 also has clearance with respect to the clutch surface 35 just slightly greater than the clearance between the surfaces 43 and 44. The springs 38 are sufficiently strong to retain the discs and reaction member 50 in the intended position, while the thrust washer 32 maintains the inner end of the shaft 25 against the thrust bearing 26. By making the reaction member 50 in two parts, and employing the interposed shims 55, the desired clearances may be readily obtained.

By "running clearance" is meant a spacing sufficient to permit the clutch discs and surfaces to rotate with respect to each other without binding or undue friction. Numerically, this will usually mean a spacing of one or two thousandths of an inch, or less, depending upon diameters and face lengths, as is well understood in machine design.

The condition of clearance just described may be understood as corresponding to the end of the free movement stroke of the lever 27, and the beginning of the interlocking or driving stroke. Upon movement of the lever 27 up from the plane of the paper, as viewed in Fig. 1, the shaft 25 and connected disc 28 and reaction member 50 will be rotated in unison, the rotation corresponding to clockwise motion as viewed in Fig. 2, and movement to the left as viewed in Fig. 5. The camming action between the inclined surfaces of the teeth 36 and 45 thus exerts an axial thrust on the floating disc 41. Axial movement is possible, because the inclined surfaces of the teeth 56 on the reaction annulus 54 have a slight lead over the teeth 47, as will be readily apparent from an inspection of Fig. 5, which figure also shows the clearance gaps between the roots of interengaging teeth. The periphery 43 of the disc 41 thereupon binds against the clutch surface 44 of the plate 19. At the same time, the reaction of the thrust between the lower disc 28 and the floating disc 41 causes the disc 28 to press against the resilient thrust washer 32, flattening it to some extent, and causing the shaft 25 to move axially, thereby engaging the periphery 34 of the disc 28 with the clutch surface 35 of the plate 21. The shaft 25 and housing 11 are then locked together, and will rotate in unison during the remainder of the stroke in the same direction.

When the motion of the lever 27 and shaft 25 is reversed, the reaction teeth 56 ride up on the teeth 47 of the floating disc 41, thus urging the disc away from its engagement with the plate 19. At the same time, the positively driven teeth 36 on the connected disc 28 are receding from the teeth 45, thus enabling the floating disc to move downwardly, and the lower disc and shaft to move upwardly into disengaging position. The bumper ring 39 cushions the axial movement of the discs and damps out vibrations, while the springs 38 not only aid in the axial spacing of the parts, but also retain them in operative superimposed positions.

It will be seen that only a very slight axial movement of the clutch discs is required to cause complete separation of the conical clutch surfaces, and that the engagement between the several sets of ratchet or cam teeth is positive at all times. Hence, the conditions of engagement and disengagement can be established and interchanged through a rotary movement of only a few degrees of arc, and the tendency of the clutch surfaces to drag is greatly minimized. It will also be noted that if the load or resistance imposed by the driven housing is high, the engagement is enhanced. That is, if the housing 11 be considered as tending to rotate counterclockwise while the shaft 25 is rotating clockwise, the effect would be to pull the clutch discs also in a counterclockwise direction, which of course is impossible within the limits of the strength of the materials. Hence, high resistances simply cause the clutch surfaces to engage more tightly, and thereby overcome any tendency to slip.

To describe the operation in other terms, it will be seen that housing 11 contains two clutch discs 28 and 41, the former being pinned or otherwise secured to the input shaft 25, and therefore constrained to rotate therewith at all times. The disc 41 is loosely mounted on the shaft 25, and therefore it is enabled to rotate at the same speed, or momentarily at a slightly different speed. The reaction member 50 is also pinned to the shaft 25, and it also is constrained to rotate in unison with the shaft and the secured disc 28. Upon reversal of the shaft rotation in the locking direction, the fixed components 28 and 50 momentarily have a greater velocity or acceleration than the floating disc 41.

This differential rotary motion causes the teeth 36 of the disc 28 to move relative to the intermeshing teeth 45 of the disc 41, in a direction forcing the two discs apart, and into clutching engagement with the housing 11. Upon reversal of rotation, the teeth 56 of the shaft-connected reaction member move with respect to the teeth 47 of the disc 41, to force the disc 41 away from the housing wall, and permit the disc 28 to be disengaged under spring pressure.

It will, of course, be understood that the coupling just described is applicable to many situations wherein the oscillatory motion of one shaft imparts intermittent unidirectional motion to another. Or, if the input shaft 25 be considered as rotating continuously in the driving direction, that is to say, through multiples of 360° of arc, the housing 11 will likewise rotate continuously instead of intermittently, but will "free wheel" if the rotation of the shaft 25 is reversed. A special application of the latter case is illustrated in the embodiment of the invention shown in Figs. 6 and 7, the problem here being to provide for continuous motion of the drive shaft in one direction for extended periods of time, and to arrest the rotation of the drive shaft in the opposite direction. This problem is frequently encountered in power transmission, and one difficulty to its solution has been the friction losses and mechanical wear inherent in various types of known overrunning clutches or "no back" mechanisms.

The structure shown in Figs. 6 and 7 is identical or similar in many respects to that just described, and a summary description of these parts will therefore suffice for full understanding. The housing 61 comprises end members 62 and 63 and interposed clutch plates 64 and 65, which are held together with bolts 66. Each of the end sections 62 and 63 is bored and fitted with bearings 67 and 68 in which is rotatably mounted a through shaft 69, having splines 71 at each end for connection to other shafts through which power is transmitted. Suitable members, such as lugs 72 formed on the housing, provide for the rigid connection of the housing to a fixed frame 73.

Mounted on the shaft 69 is a fixed clutch disc 75, retained by a pin 76, and having a conical periphery 77 adapted on occasion to bind against the clutch surface 78 of the plate 65. This disc abuts the end section 63 through a resilient thrust washer 79, and it is formed on its opposite side with cam teeth 81, corresponding to the teeth 36 of the disc 28. A floating disc 82, formed with upper and lower teeth 83 and 84 and a frustoconical periphery 85, is rotatably mounted on the shaft 69 by means of a bushing 86. Springs 87 and a bumper ring 88 are interposed between the fixed and floating discs. The periphery 85 is adapted on occasion to bind against the inner clutch surface 89 of the plate 64, again in the manner heretofore explained.

A reaction member 90 is mounted within the housing 61, and it includes a sleeve 91 secured to the shaft 69 by a pin 92 and key 93, the sleeve being rotatably mounted in the bearing 67. The reaction member also includes a collar 94, restrained from relative rotary movement on the shaft by the key 93, and axially adjusted with respect thereto by shims 95. The under side of the collar 94 is formed with an annulus of ratchet teeth 96, engaging the teeth 83 of the floating disc 82. The construction as thus far described is thus the same in detail and operative result as the first embodiment, except that the housing 61 is fixed, and the shaft 69 has been extended through the housing and is intended to be continuously rotated. Hence, when the shaft 69 is rotated counterclockwise as viewed in Fig. 7, it will turn freely, the clutch discs then being retracted from the corresponding fixed clutch surfaces. Reverse rotation causes the clutch elements to engage, thereby locking the shaft.

The upper portion of the reaction collar 94 is formed with a pair of diametrically spaced bosses 101, on which are pivotally mounted, by means of screws 102, levers 103 whose outer ends are formed with weights 104. The pivoted ends of the levers are formed with gear teeth 105, extending radially inwardly to mesh with pairs of teeth 106 formed on the upper portion of the floating disc 82. Springs 107, interposed between the midportions of the levers 103 and the internal wall of the end section 62, normally urge the weights 104 inwardly, thereby tending to rotate the floating disc 82 counterclockwise, as viewed in Fig. 7. Contact between the weights and the annular teeth 83 is prevented by stop pins 108. The adjustment is such that, when the weights are in this position, the peripheries of the clutch discs are slightly spaced from the conical surfaces 78 and 89, as previously explained. Hence, a slight clockwise rotation of the shaft 69 will cause the various cam teeth to separate the clutch discs 75 and 82, thereby locking the shaft from rotation.

When the shaft 69 is rotated counterclockwise at relatively low speed, it will turn freely, but conditions can arise under which there is some drag between the peripheries of the clutch discs and their complementary clutch surfaces. At such low speeds, this is not serious. In fact, the low speed condition generally corresponds to an approach, in point of time, to the generation of forces operating on the shaft 69, which will tend to reverse the direction of rotation. It is better to adjust the several clutch elements so that they will lock practically instantaneously upon attempted reverse rotation, and tolerate some drag, than to increase the clearances and encounter probabilities of shaft oscillation, vibration, and pulsating power transmission.

As the speed of the shaft 69 increases, a point is reached when the centrifugal force acting on the weights 104 will move them outwardly, causing the gear teeth 105 to rotate counterclockwise, as viewed in Fig. 7, and therefore imparting clockwise rotation to the teeth 106 of the floating disc 82. Recalling that the teeth 83 and 84 correspond to the teeth 47 and 45 of the comparable disc 41, this limited clockwise movement is equivalent to shifting the floating disc 82 to the left, as viewed in Fig. 5. Relatively speaking, this again is the same as shifting the shaft connected discs (compare 28 and 50 of Fig. 5) to the right, which corresponds to an unlocking direction of rotation. The action of the centrifugally actuated weights is, therefore, to effect an additional freedom between the intermeshing ratchet teeth, so that the pairs of surfaces 77, 78, and 85, 89, may have greater clearance. Hence, during high speed counterclockwise rotation of the shaft 69, the above noted tendency of the cooperating clutch surfaces to rub or drag is minimized. Any force which could reverse the rotation of the shaft must, of course, first reduce the velocity to zero, which would be accompanied by restoration of the counterweights 104 to their initial position, and thereby condition the clutch for immediate seizure to prevent actual reverse rotation.

While the invention has been described with respect to a preferred embodiment and a modification thereof, it is apparent that various changes and alterations may be made without departure from its principles. It is therefore intended that the invention should be accorded a scope commensurate with that expressed in the following claims.

I claim:

1. A unidirectional drive coupling comprising a housing, a shaft rotatably mounted in the housing, a pair of clutch discs mounted on the shaft within the housing, one of said discs being fixedly connected to the shaft for rotation therewith and the other of said discs being rotatable on said shaft, complementary clutch surfaces formed on the peripheries of said discs and the walls of the housing, ratchet teeth formed on the surfaces of said discs and interengaging each other, a reaction member connected to the shaft within the housing adjacent one of said discs, said reaction member and said one disc being formed with interengaging ratchet teeth, all of said teeth being inclined in the same direction and the interengaging teeth having root clearance whereby rotation of the shaft in one direction causes the teeth to force said discs into engagement with the housing walls and rotation in the opposite direction permits said discs to be disengaged from the walls, and a spring urging the fixedly connected disc out of engagement with the housing wall.

2. A unidirectional drive coupling comprising a housing, a shaft rotatably mounted within the housing, a pair of clutch discs in the housing and mounted on the shaft, one of said discs being fixedly connected to the shaft for rotation therewith and the other of said discs being rotatable on said shaft, a reaction member mounted in the housing on one side of one of said discs, said reaction member including a sleeve fixedly connected to the shaft for rotation therewith, and a collar connected to the shaft for rotation therewith and also for axial movement with respect thereto, a spacing shim interposed between the collar and sleeve, said reaction member and said one disc being formed with interengaging ratchet teeth and said pair of discs also being formed with interengaging ratchet teeth, complementary clutch surfaces formed on said discs and the walls of the housing, and spring means biased to urge said discs in a direction to disengage said complementary clutch surfaces.

3. A unidirectional drive coupling comprising a housing, a shaft rotatably mounted in the housing, a pair of clutch discs mounted on the shaft within the housing, one of said discs being fixedly connected to the shaft for rotation therewith and the other of said discs being rotatable with respect to the shaft, a set of interengaging ratchet teeth formed on the surfaces of the discs, a reaction member in the housing and mounted on the shaft for fixed rotation therewith, said reaction member being positioned on one side of one of said discs, said reaction member and said one disc also being formed with another set of interengaging ratchet teeth, the teeth of said sets being inclined in the same direction and being disposed out of phase with each other, and complementary clutch surfaces formed on said discs and the walls of the housing.

4. A unidirectional drive coupling comprising a housing, a shaft rotatably mounted in the housing, a pair of clutch discs mounted on the shaft within the housing, one of said discs being fixedly connected to the shaft for rotation therewith and the other of said discs being rotatable with respect to the shaft, said discs being formed with peripheral clutch surfaces, complementary clutch surfaces formed on the walls of the housing, a set of interengaging ratchet teeth formed on said discs, resilient means interposed between the discs to rotatively urge the discs into a predetermined normal alignment of said teeth, a reaction member fixedly connected to the shaft for rotation therewith, said reaction member being positioned on one side of the rotatably mounted disc, a second set of interengaging ratchet teeth formed on the reaction member and rotatably mounted disc, and spring means in the housing engaging one of said discs and biased to urge the discs out of engagement with the complementary clutch surfaces of the housing.

5. A unidirectional drive coupling comprising a housing, a shaft rotatably mounted in the housing, a pair of clutch discs in the housing and mounted on the shaft, one of said discs being connected to the shaft for rotation therewith and the other of said discs being rotatable with respect to the shaft and axially movable with respect thereto, complementary clutch surfaces formed on the discs and the walls of the housing, a set of interengaging ratchet teeth formed on adjacent sides of the discs, a reaction member in the housing on the opposite side of the rotatably mounted disc, a second set of interengaging ratchet teeth formed on the reaction member and rotatably mounted disc, and centrifugally actuated means interposed between the reaction member and rotatably mounted disc to impart to the rotatably mounted disc rotative motion to shift said disc axially of the shaft and with respect to the walls of the housing.

6. A unidirectional drive coupling comprising a housing, a shaft rotatably mounted in the housing, a pair of clutch discs in the housing, one of said discs being connected to the shaft for rotation therewith and the other of said discs being rotatably mounted on the shaft, a set of interengaging ratchet teeth formed on adjacent surfaces of the discs, complementary clutch surfaces formed on the peripheries of the discs and the walls of the housing, a reaction member mounted on the opposite side of the rotatably mounted disc and connected to the shaft for rotation therewith, a second set of interengaging ratchet teeth formed on the reaction member and the rotatably mounted disc, centrifugally actuated weights carried by the reaction member, and a driving connection between the weights and the rotatably mounted disc to impart motion in a predetermined direction to said rotatably mounted disc when said shaft is rotated above a predetermined speed.

7. A unidirectional coupling as set forth in claim 6, wherein the motion imparted to the rotatably mounted disc when the shaft is rotated above said predetermined speed increases the clearance between the complementary clutch surfaces of the discs and housing walls.

8. A unidirectional coupling as set forth in claim 6, wherein the housing is relatively fixed with respect to a machine frame, and the shaft is provided with means to transmit motion through the housing when the shaft is rotated.

References Cited in the file of this patent

UNITED STATES PATENTS

| Number | Name | Date |
|---|---|---|
| 852,587 | Towler | May 7, 1907 |
| 1,045,527 | Daimler | Nov. 26, 1912 |
| 2,057,761 | Bolton | Oct. 20, 1936 |
| 2,351,996 | Morgan | June 20, 1944 |